United States Patent
Enomoto (10) Patent No.: US 9,878,733 B2
(45) Date of Patent: Jan. 30, 2018

(54) STEERING DEVICE OF WORKING VEHICLE AND METHOD OF CONTROLLING STEERING DEVICE OF WORKING VEHICLE

(71) Applicant: KOMATSU LTD., Tokyo (JP)

(72) Inventor: Ryota Enomoto, Komatsu (JP)

(73) Assignee: KOMATSU LTD., Tokyo (JP)

( * ) Notice: Subject to any disclaimer, the term of this patent is extended or adjusted under 35 U.S.C. 154(b) by 782 days.

(21) Appl. No.: 14/379,799

(22) PCT Filed: May 29, 2014

(86) PCT No.: PCT/JP2014/064307
§ 371 (c)(1),
(2) Date: Aug. 20, 2014

(87) PCT Pub. No.: WO2014/181893
PCT Pub. Date: Nov. 13, 2014

(65) Prior Publication Data
US 2016/0236704 A1    Aug. 18, 2016

(51) Int. Cl.
*B62D 1/22* (2006.01)
*B62D 1/12* (2006.01)
*B62D 3/14* (2006.01)

(52) U.S. Cl.
CPC ............... *B62D 1/22* (2013.01); *B62D 1/12* (2013.01); *B62D 3/14* (2013.01)

(58) Field of Classification Search
None
See application file for complete search history.

(56) References Cited

U.S. PATENT DOCUMENTS

2007/0289803 A1   12/2007   Yoshikawa et al.
2008/0277190 A1   11/2008   McCord et al.
(Continued)

FOREIGN PATENT DOCUMENTS

CN   102745227 A   10/2012
CN   102892632 A   1/2013
(Continued)

OTHER PUBLICATIONS

Mashine Translation of JP 2013184669.*

*Primary Examiner* — Abby Lin
*Assistant Examiner* — Paul Castro
(74) *Attorney, Agent, or Firm* — Drinker Biddle & Reath LLP (57) ABSTRACT

A steering device of a working vehicle includes a lever, a first switch, a lever support member, a second switch, and a control device. The first switch sets a steering signal to be in a valid/invalid state. The lever support member is provided so as to be able to flip up from a certain position of performing tilting operation. The second switch attains conduction when the lever support member is located at the certain position, and attains non-conduction in conjunction with the case where the lever support member is flipped up. The control device sets steering with use of the lever to be valid/invalid. The first switch has a plurality of terminals which respectively attain conduction of a steering signal in accordance with a setting of a valid state and an invalid state and are electrically connected to the control device in parallel with the second switch.

8 Claims, 10 Drawing Sheets

(56) References Cited

U.S. PATENT DOCUMENTS

| | | |
|---|---|---|
| 2012/0261207 A1 | 10/2012 | Kawanaka et al. |
| 2013/0169040 A1* | 7/2013 | Hallet .................. B60R 16/027 307/10.1 |
| 2013/0249315 A1 | 9/2013 | Zhou et al. |
| 2015/0083792 A1 | 3/2015 | Bullock et al. |

FOREIGN PATENT DOCUMENTS

| | | | |
|---|---|---|---|
| EP | 1693282 A1 | | 8/2006 |
| EP | 2182629 A2 | | 5/2010 |
| JP | S58-190258 U | | 12/1983 |
| JP | S61-2419 A | | 1/1986 |
| JP | H1-152830 | | 10/1989 |
| JP | H1-155561 U | | 10/1989 |
| JP | H10-45014 A | | 2/1998 |
| JP | 2005-256408 A | | 9/2005 |
| JP | 2013-184669 A | | 9/2013 |
| JP | 2013184669 A | * | 9/2013 |
| JP | 2013-232404 A | | 11/2013 |
| JP | 5362113 B1 | | 12/2013 |

\* cited by examiner

PILOT HYDRAULIC PRESSURE

PILOT HYDRAULIC PRESSURE

| FLIP-UP SWITCH | VALIDATING SWITCH | ABNORMALITY |
|---|---|---|
| ON | ON | |
| OFF | ON | ○ |
| ON | OFF | |
| OFF | OFF | |

(B)

| FLIP-UP SWITCH | VALIDATING SWITCH | ABNORMALITY |
|---|---|---|
| ON → OFF | ON | ○ |
| OFF → ON | ON | ○ |
| ON → OFF | OFF | △ |
| OFF → ON | OFF | △ |

(C)

| FLIP-UP SWITCH | VALIDATING SWITCH | ABNORMALITY |
|---|---|---|
| ON | ON → OFF | ○ |
| ON | OFF → ON | ○ |
| OFF | OFF → ON | ○ |
| OFF | ON → OFF | ○ | ns
STEERING DEVICE OF WORKING VEHICLE AND METHOD OF CONTROLLING STEERING DEVICE OF WORKING VEHICLE

TECHNICAL FIELD

The present invention particularly relates to a working vehicle having a steering device and a method for controlling a steering device of a working vehicle.

BACKGROUND ART

A wheel loader is provided with a steering wheel for performing steering operation during running on a public road or during high-speed running at a working site. Moreover, the wheel loader is provided with a lever such as a joy stick so that efficient steering operation can be performed with a simple operation at a working site where short-distance running and steering operation are performed repeatedly.

PTD 1 discloses a steering loader which enables steering operation by both rotating operation with use of a steering wheel and lever operation with use of a lever. According to PTD 1, since there is a case where steering operation is performed unintentionally when a driver touches a lever by mistake during rotating operation with use of a steering wheel, there has been proposed a method of allowing a steering wheel priority valve to operate so as to prioritize the operation with use of the steering wheel.

On the other hand, conventionally, a switch for enabling (validating) lever operation is provided to prevent misoperation of the lever operation. As a configuration of the switch, a configuration of providing a plurality of switch rather than a single switch has been employed. For a configuration of an electric circuit, a configuration of connecting a plurality of switches together in series and performing determination of enabling lever operation when all the plurality of switches are turned on (validated) has been employed.

CITATION LIST

Patent Document

PTD 1: Japanese Patent No. 5362113

SUMMARY OF INVENTION

Technical Problem

However, according to the configuration of connecting the plurality of switches in series in an electric circuit, even when an abnormality occurs in one switch among the plurality of switches, another switch connected in series to the switch having an abnormality is present on a signal path. Therefore, there has been a problem that determination cannot be made readily on which switch among the plurality of switches present on the signal path is in an abnormal state.

The present invention was made to solve the problem described above, and its object is to provide a steering device of a working device and a method for controlling a steering device of a working device, capable of determining which switch has an abnormality in a simple manner.

Other problems and new features will be apparent from the description in the specification and from the attached drawings.

Solution to Problem

A steering device of a working vehicle in accordance with one aspect of the present invention includes a lever, a first switch, a lever support member, a second switch, and a control device. The lever performs tiling operation for steering. The first switch sets a steering signal from the lever to be in a valid/invalid state. The lever support member is provided so as to be able to flip up from a certain position of performing tiling operation with use of the lever and supports the lever. The second switch attains conduction when the lever support member is located at the certain position, and attains non-conduction in conjunction with a case where the lever support member is flipped up from the certain position. The control device sets steering with use of the lever to be valid/invalid. The first switch has a plurality of terminals which attain conduction of a steering signal from the lever in accordance with setting of a valid state and an invalid state and are electrically connected to the control device in parallel with the second switch.

According to the steering device of the working vehicle of the present invention, the first switch is configured to have a plurality of terminals which attain conduction of the steering signal from the lever in accordance with setting of the valid state and the invalid state and are electrically connected to the control device in parallel with the second switch. Thus, since the first and second switches are connected in parallel with each other to the control device, and the first switch attains conduction in accordance with setting of the valid state and the invalid state of the steering signal from the lever and is electrically connected to the control device, a switch having an abnormality can be determined in a simple manner.

Preferably, the control device determines an abnormal state in accordance with signals inputted based on the first and second switches.

According to the description above, since the control device determines the abnormal state based on a combination of the inputted signals of the first and second switches, a switch having an abnormality can be determined in a simple manner.

Preferably, the control device determines the abnormal state when signals inputted from the plurality of terminals based on the first switch are signals having the same electric potential.

According to the description above, since an abnormal state is determined based on the input of the signal having the same electric potential, a switch having an abnormality can be determined in a simple manner.

Preferably, the steering device of the working vehicle further includes a first light-emitting element which emits light in accordance with a passing current, and a current supply circuit which can supply a current to the first light-emitting element. The control device activates the current supply circuit in accordance with a combination of signals inputted based on the first and second switches.

According to the description above, the light-emitting element allows an operator to readily understand and confirm that tilting operation by the lever is validated.

Preferably, the steering device of the working vehicle further includes a third switch. The third switch is connected to the current supply circuit in parallel with the first light-emitting element to adjust a steering angle in accordance with an operation amount of the lever.

According to the description above, adjustment of the steering angle in accordance with an operation amount of the lever can be performed by the third switch.

Preferably, the steering device of the working vehicle further includes a second light-emitting element. The second light-emitting element is connected to the current supply circuit in parallel with the first light-emitting element and connected to the third switch in series to emit light in accordance with a passing current.

According to the description above, the light-emitting element allows an operator to readily understand and confirm that adjustment of the steering angle is performed in accordance with an operation amount of the lever.

Preferably, the control device determines the abnormal state in accordance with an input order of signals inputted based on the first and second switches.

According to the description above, the control device can prompt operation in the order appropriate for determination of the abnormal state in accordance with the input order of the signal.

Preferably, the steering device of the working vehicle further includes a notifying unit. The notifying unit notifies the abnormal state.

According to the description above, notification allows an operator to readily understand an abnormal state.

A method for controlling a steering device of a working vehicle according to one aspect of the present invention is a method for controlling a steering device of a working vehicle including a first switch for setting a steering signal from a lever which performs tilting operation for steering to be in a valid/invalid state, a lever support member which is provided so as to be able to flip up from a certain position of performing the tilting operation by the lever and supports the lever, and a second switch which attains conduction when the lever support member is located at a certain position and attains non-conduction in conjunction with the case of being flipped up from the certain position. The control method described above includes the steps of operating the first and second switches and determining an abnormal state in accordance with a signal inputted based on the operation of the first and second switches. The step of determining an abnormal state determines the abnormal state when the second switch is changed from conduction to non-conduction, and the first switch sets the lever to be in a valid state.

According to the method for controlling the steering device of the working vehicle of the present invention, the step of determining an abnormal state determines an abnormal state when the second switch is changed from conduction to non-conduction, and the first switch sets the lever to be in the valid state. Thus, an appropriate order for operation of the first switch and the second switch can be prompted.

Advantageous Effects of Invention

As described above, according to the present invention, a steering device of a working vehicle and a method for controlling a steering device of a working vehicle can be achieved which can determine in a simple manner a switch having an abnormality.

DESCRIPTION OF EMBODIMENT

In the following, the embodiment will be described with reference to the drawings.

In the following, a wheel loader as an example of a "working vehicle" will be described with reference to the drawings.

<Overall Configuration of Wheel Loader>

Figure 1:
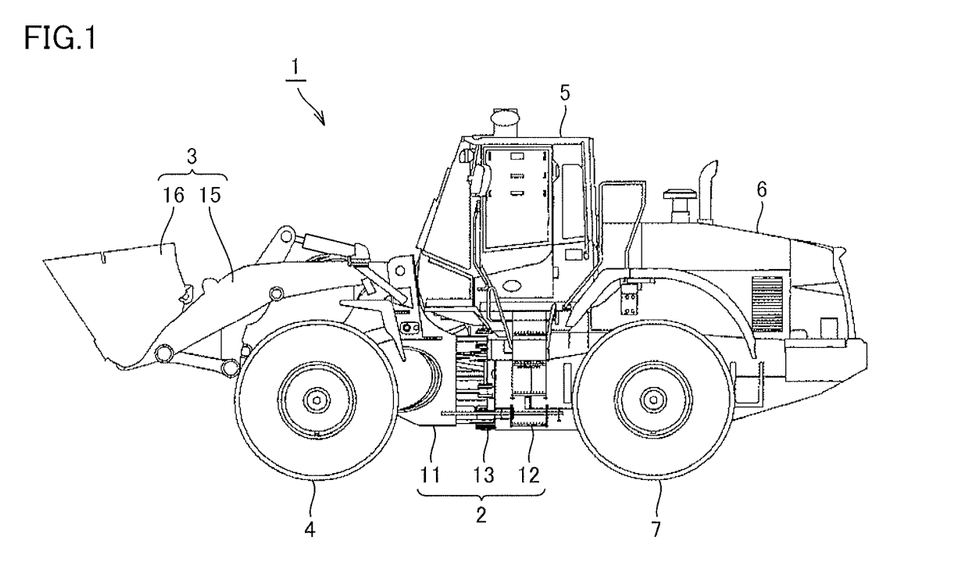
FIG. 1 represents an overall configuration of a wheel loader 1 provided with a steering device in accordance with one embodiment.

FIG. 1 represents an overall configuration of a wheel loader 1 provided with a steering device in accordance with one embodiment. It should be noted that FIG. 1 illustrates a side elevation of wheel loader 1.

As shown in FIG. 1, wheel loader 1 includes a vehicle body frame 2, a work implement 3, a pair of front tires 4, a cab 5, an engine room 6, and a pair of rear tires 7.

Vehicle body frame 2 has a so-called articulated structure, and includes a front frame 11, a rear frame 12, and a coupling portion 13. Front frame 11 is arranged in front of rear frame 12 and coupled by coupling portion 13 to rear frame 12 to be freely rotatable in leftward and rightward directions.

Work implement 3 has a lift arm 15 and a bucket 16. Lift arm 15 and bucket 16 are driven by pressure oil supplied from a hydraulic pump which is not illustrated in the drawings. Lift arm 15 is supported by front frame 11 to be freely rotatable at its base end. Bucket 16 is attached to a leading end of lift arm 15 in a freely rotatable manner.

Cab 5 is provided on rear frame 12, and a steering wheel for steering operation, a running operation lever, an operation member for operating the work implement, various indicating devices, and the like are arranged in cab 5.

<Configuration of Steering Device>

Figure 2:
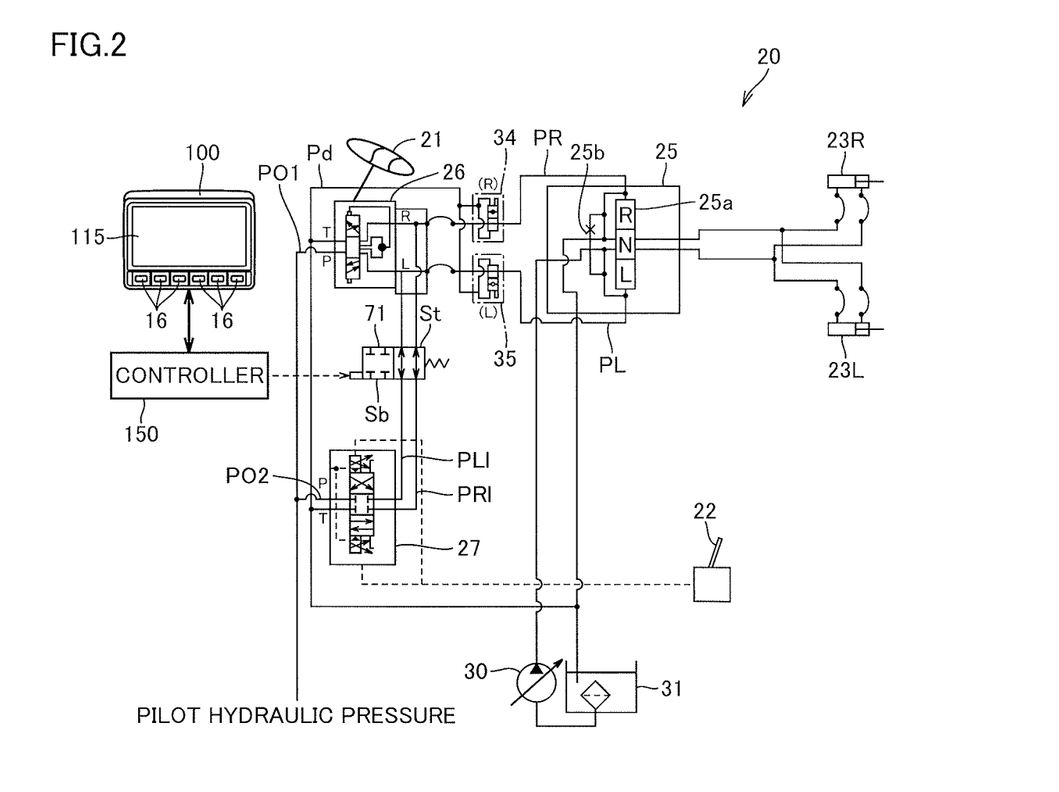
FIG. 2 represents a configuration of a steering device 20 in accordance with the embodiment.

FIG. 2 represents a configuration of a steering device 20 in accordance with the embodiment.

Steering device 20 illustrated in FIG. 2 is a device for turning a vehicle by rotating front frame 11 with respect to rear frame 12.

Steering device 20 has a steering wheel 21 rotated for steering, a running operation lever 22 tilted for steering, and left and right steering cylinders 23L, 23R. Steering wheel 21 and running operation lever 22 are members operated for steering (steering devices). Operating these members causes left and right steering cylinders 23L, 23R to expand and contract, so that front frame 11 is rotated with respect to rear frame 12.

Moreover, steering device 20 has a steering valve 25, an orbit roller 26 as a steering wheel control valve, a lever electromagnetic control valve 27, and a steering wheel priority valve 71.

(Steering Valve 25)

Steering valve 25 is configured to supply hydraulic oil from pump 30 to left and right steering cylinders 23L, 23R in accordance with a pilot hydraulic pressure from orbit roller 26 or lever electromagnetic control valve 27.

Specifically, a directional control valve 25a constituting steering valve 25 is switched to a left turn stage L when hydraulic oil is supplied to a left pilot port, and switched to a right turn stage R when hydraulic oil is supplied to a right pilot port. When directional control valve 25a is switched to left turn stage L, hydraulic oil from pump 30 is supplied to a bottom side oil chamber of left steering cylinder 23L and a rod side oil chamber of right steering cylinder 23R, and the hydraulic oil provided in the bottom side oil chamber of right steering cylinder 23R and in the rod side oil chamber of left steering cylinder 23L is brought back to a tank 31 through a drain oil passage Pd.

On the contrary, when directional control valve 25a is switched to right turn stage R, the hydraulic oil from pump 30 is supplied to the bottom side oil chamber of right steering cylinder 23R and the rod side oil chamber of left steering cylinder 23L, and the hydraulic oil provided in the bottom side oil chamber of left steering cylinder 23L and in the rod side oil chamber of right steering cylinder 23R are brought back to tank 31 through drain oil passage Pd.

Moreover, when the hydraulic oil is not supplied to left and right pilot ports, directional control valve 25a is switched to a neutral stage N, and a communication between left and right steering cylinders 23L, 23R and pump 30 is intercepted. Moreover, a communication between left and right steering cylinders 23L, 23R and tank 31 is also intercepted.

Moreover, both pilot ports of directional control valve 25a communicate through a diaphragm 25b. When the hydraulic oil is supplied to one pilot port, hydraulic oil in the oil passage on the other pilot port side is brought back to tank 31 through orbit roller 26 and drain oil passage Pd.

Although details will be omitted, this steering valve 25 includes an unloading valve, a relief valve, a safety valve, and the like in addition to directional control valve 25a described above.

(Orbit Roller 26)

Orbit roller 26 has a P port on an input side connected to a pump (not illustrated in the drawings) for pilot hydraulic pressure such as a fan pump through a first input oil passage P01. This orbit roller 26 ejects hydraulic oil proportional to a rotation of the steering wheel from the L port when steering wheel 21 is rotated leftward, and from the R port when steering wheel 21 is rotated rightward. The L port on the output side is connected with left pilot oil passage PL, and the R port is connected with right pilot oil passage PR.

Left pilot oil passage PL is connected to the left pilot port of directional control valve 25a constituting steering valve 25. Moreover, right pilot oil passage PR is connected to the right pilot port of directional control valve 25a. Left and right pilot oil passages PL, PR are provided with stop valves 34, 35, respectively. These stop valves 34, 35 are adapted to forcibly stop a supply of the pilot hydraulic pressure to steering valve 25.

A T port on an input side of orbit roller 26 is connected to tank 31 through drain oil passage Pd. As described above, when the hydraulic oil is supplied to one pilot port of directional control valve 25a, the oil passage on the other pilot port side is connected to drain oil passage Pd through this T port.

(Lever Electromagnetic Control Valve 27)

Lever electromagnetic control valve 27 has a P port on an input side connected through a second input oil passage P02 to the pump to which first input oil passage P01 is connected. Lever electromagnetic control valve 27 is adapted to eject hydraulic oil inputted from the P port to the L port or R port on an output side in accordance with operation of running operation lever 22. The L port is connected with a left lever pilot oil passage PL1, and left lever pilot oil passage PL1 is connected to left pilot oil passage PL. Moreover, the R port is connected with a right lever pilot oil passage PR1, and right lever pilot oil passage PR1 is connected to right pilot oil passage PR. A steering wheel priority valve 71 is provided on left lever pilot oil passage PL1 and right lever pilot oil passage PR1.

As described above, the hydraulic oil from lever electromagnetic control valve 27 is supplied to each pilot port of steering valve 25 through steering wheel priority valve 71 and left and right pilot oil passages PL, PR.

(Steering Wheel Priority Valve 71)

Steering wheel priority valve 71 is provided on route of left and right lever pilot circuits PL1, PR1 on an output side of lever electromagnetic control valve 27. More in detail, the output port of lever electromagnetic control valve 27 is connected with left lever pilot oil passage PL1 and right lever pilot oil passage PR1. Left lever pilot oil passage PL1 is connected to left pilot oil passage PL, and right lever pilot oil passage PR1 is connected to right pilot oil passage PR. Steering wheel priority valve 71 is provided on route of left and right lever pilot oil passages PL1, PR1.

Steering wheel priority valve 71 is controlled in accordance with a command from a controller 150, and switched between a communication stage St and an interception stage Sb. In communication stage St, the output port of lever electromagnetic control valve 27 is connected to left and right pilot oil passages PL, PR through left and right lever pilot oil passages PL1, PR1. Moreover, in interception stage Sb, a communication between the output port of lever electromagnetic control valve 27 and left and right pilot oil passages PL, PR is intercepted.

[Steering Operation]

Figure 3:
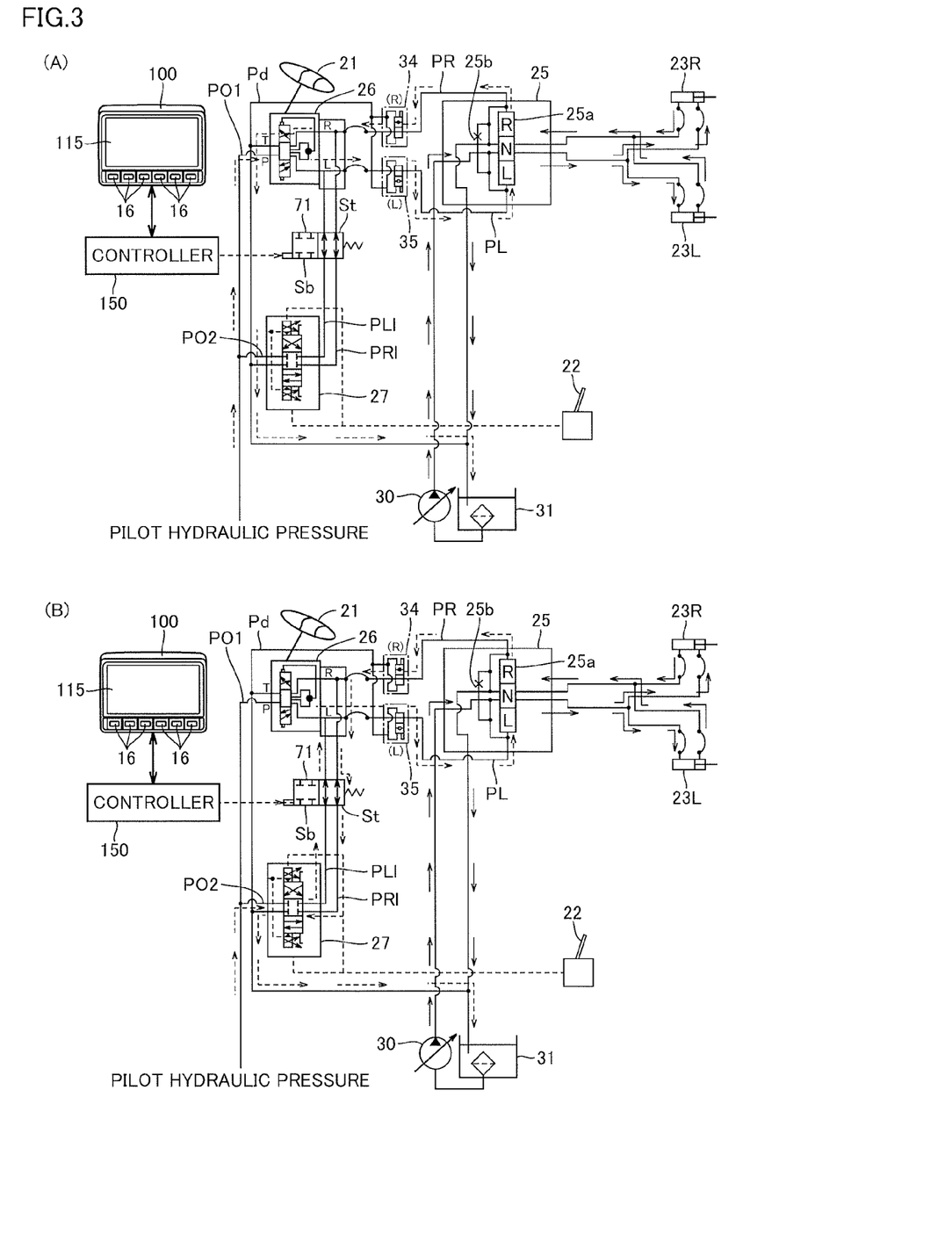
FIG. 3 represents operation of the steering device during a left turn.

FIG. 3 represents operation of the steering device during the left turn.

FIG. 3(A) represents a flow of steering hydraulic oil (solid lines) and a flow of pilot hydraulic oil (broken lines) in the case where rotating operation is performed by the steering wheel for the left turn.

When steering wheel 21 is operated, the hydraulic oil is inputted to orbit roller 26 from a first input oil passage P01. This hydraulic oil is inputted to the left pilot port of directional control valve 25a of steering valve 25 through stop valve 35. The input of a pilot hydraulic pressure allows directional control valve 25a to be switched to left turn stage L.

At this time, the hydraulic oil of right pilot oil passage PR is brought back from the T port of orbit roller 26 through drain oil passage Pd to tank 31.

When directional control valve 25a of steering valve 25 is switched to left turn stage L, the hydraulic oil from pump 30 is supplied through steering valve 25 to the bottom side oil chamber of left steering cylinder 23L and the rod side oil chamber of right steering cylinder 23R.

Moreover, the hydraulic oil provided in the bottom side oil chamber of right steering cylinder 23R and in the rod side oil chamber of left steering cylinder 23L is brought back through steering valve 25 to tank 31.

During the operation of steering wheel 21, as mentioned above, the hydraulic oil is brought back from the T port of orbit roller 26 to tank 31.

[During Operation of Running Operation Lever 22]

FIG. 3(B) represents a flow of steering hydraulic oil (solid lines) and a flow of pilot hydraulic oil (broken lines) in the case where tilting operation by running operation lever 22 is performed for the left turn.

In the case where running operation lever 22 is operated, a command is given from controller 150 to steering wheel priority valve 71, and steering wheel priority valve 71 is switched to communication stage St.

In such a state, the hydraulic oil inputted from a second input oil passage P02 is outputted from running operation lever 22 to left lever pilot oil passage PL1. This hydraulic oil is supplied through steering wheel priority valve 71 to left pilot oil passage PL, and inputted to the left pilot port of directional control valve 25a of steering valve 25 in the manner same as the case of rotating operation by the above-described steering wheel 21. Thus, directional control valve 25a is switched to left turn stage L. Moreover, the pilot oil of right pilot oil passage PR is brought back from a drain T port of lever electromagnetic control valve 27 through drain oil passage Pd to tank 31.

A flow of the steering hydraulic oil is completely the same as the case of rotating operation by steering wheel 21.

The operation of the steering device during the left turn has been described. However, the operation in the case of the right turn is basically the same except for oil passages through which the pilot hydraulic oil and steering hydraulic oil flow.

<Configuration of Operation Panel>

A configuration of the operation panel will be described.

Figure 4:
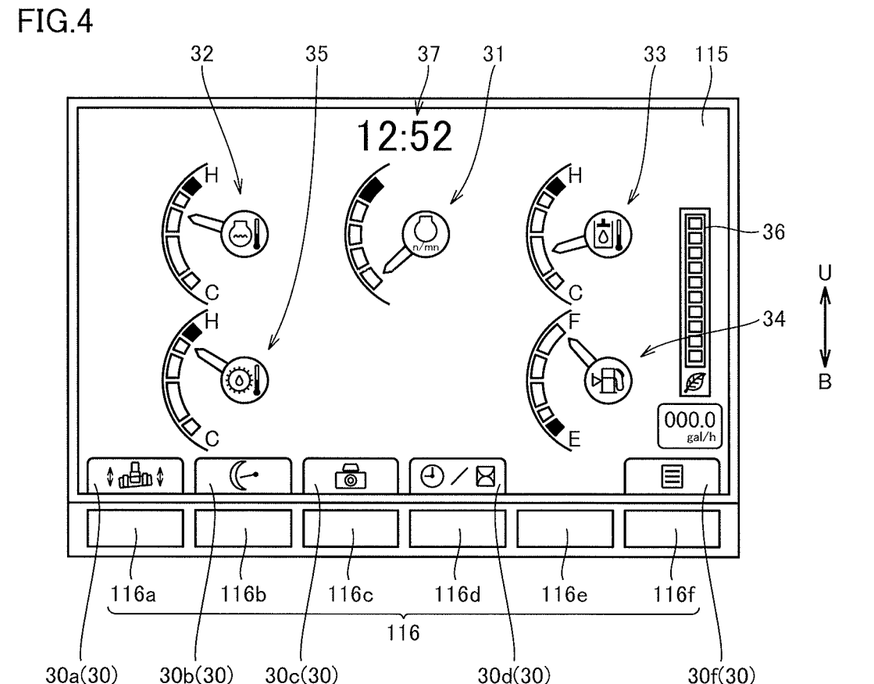
FIG. 4 represents a configuration of an operation panel 100 in accordance with the embodiment.

FIG. 4 represents a configuration of operation panel 100 in accordance with the embodiment.

As shown in FIG. 4, one example of a standard screen is illustrated which displays information related to an engine state on a display 115 of operation panel 100.

A display is made in the form of icons on display 115 so that an operator can visually confirm even during operation of wheel loader 1.

The icon shows a matter in signs with simple drawings. In the example, a plurality of icons are displayed on display 115 along with various data expressed by values.

On or above display 115 is a ceiling side of cab 5 and is represented by an arrow U, and below or under cab 5 is a floor side and is represented by an arrow B.

Under display 115, there are arranged a plurality of (in this example, six) function switches 116a, 116b, 116c, 116d, 116e, and 116f. The numeral 116 is used when these switches are not particularly distinguished, and numerals 116a, 116b, and the like are used when the switches are distinguished. At a lower end in the screen of display 115, function guides 130a, 130b, 130c, 130d, and 130f are displayed as guide indices at positions corresponding to function switches 116a, 116b, 116c, 116d, 116e, and 116f. The numeral 130 is used when these guides are not particularly distinguished, and numerals 130a, 130b, and the like are used when the guides are distinguished.

The plurality of function switches 116 are arranged on a lower side of display 115. However, the plurality of function switches 116 may be arranged at locations other than that. For example, the plurality of function switches 116 may be arranged on a lateral side or an upper side of display 115. In this case, in the screen of display 115, the plurality of function guides 130 are displayed correspondingly to positions corresponding to respective function switches 116. For example, in the case where the plurality of function switches 116 are displayed on the lateral side of display 115, a plurality of function guides 130 are displayed correspondingly to respective function switches 116 at a lateral end in the screen of display 115.

Respective function guides 130 are indices for guiding the functions of function switches 116, and are displayed on display 115 in the form of icons in the embodiment. Respective function guides 130 represent in the form of icons the functions of corresponding function switches 116. Functions are allocated to respective function guides 130 on the screen in which these guides are displayed.

Function guides 130 allow an operator to intuitively understand functions of function switches 116 and select desired function switches 116. Further, function guides 130 display functions of function switches 116, so that visibility for the operator is improved.

In the example, display 115 displays five gauge icons of a meter type. These icons are a multigauge 131, an engine water temperature gauge 132, a hydraulic oil temperature gauge 133, a fuel gauge 134, and a mission oil temperature gauge 135. These icons have a needle and a circular scale, and display quantities of the gauges by rotating the needles. Other than those described above, display 115 displays a power-saving gauge 136 representing indices of energy-saving operation based on the fuel consumption, a clock 137 representing time, and the like.

Multigauge 131 is an index which displays information related to a plurality of types of engine states by switching the information at function switches 116. In the embodiment, operation of function switch 116b allows multigauge 131 to change information related to the engine state which it displays.

For example, the example shown in FIG. 4 represents a rotation speed (engine speed per unit time) of an engine provided in wheel loader 1. When function switch 116b corresponding to function guide 130b is operated, multigauge 131 may switch a display to show, for example, a traction. Examples of other information displayed by multigauge 131 may include operating oil pressure power, engine oil pressure, a battery voltage, a traction, a vehicle speed, a clock, and an engine rotation speed. In the embodiment, the information displayed by multigauge 131 can be switched one after another at each time function switch 116b is operated one time.

As will be described later, display 115 displays an alarming message in accordance with a command from controller 150.

<Configuration of Cab 5>

Figure 5:
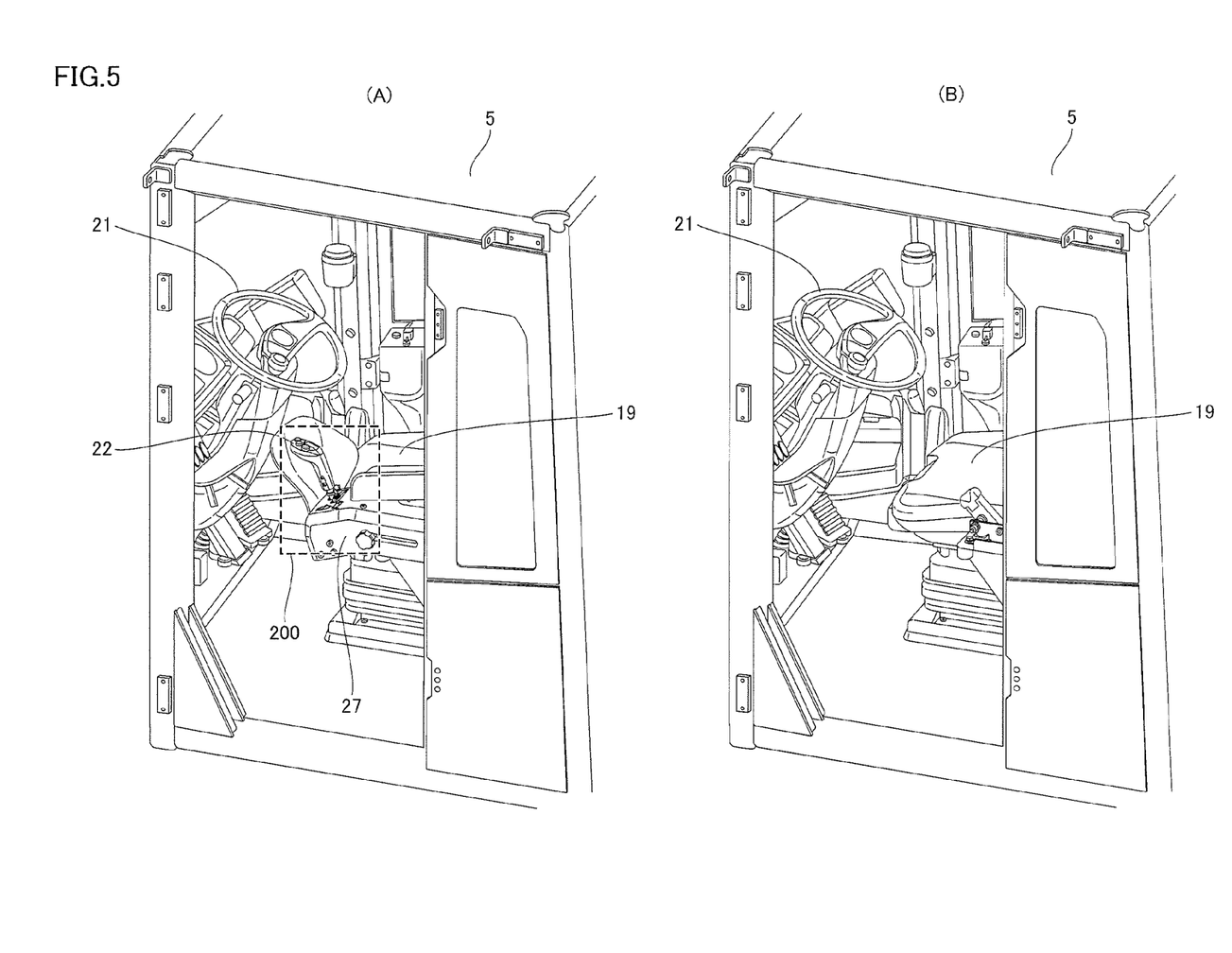
FIG. 5 is a perspective view representing an internal configuration of a cab 5 in accordance with the embodiment.

FIG. 5 is a perspective view representing an internal configuration of cab 5 in accordance with the embodiment.

As shown in FIG. 5(A), cab 5 has a steering wheel 21, an operator seat 19, a left-side operating device 37, and the like.

Operator seat 19 is a seat for allowing an operator (operating person) who gets on or out of the cab to sit and perform driving operation, and is provided in a state of being slidable forward and backward.

In front of this operator seat 19, steering wheel 21 is provided which can be operated by an operator (operating person) in a state of being seated. The operator can perform the steering operation by operating steering wheel 21.

On the left side of operator seat 19, left-side operating device 37 is provided which is operated by an operator.

Left-side operating device 37 is arranged on a left side of operator seat 19 in a view from an operator sitting on operator seat 19. On a top of left-side operating device 37, running operation lever 22 is provided. Running operation lever 22 is tilted to the left and right directions, with the forward direction of the vehicle body as a front side, to perform steering operation.

Left-side operating device 37 is provided so as to be able to flip up from a certain position where the tilting operation by running operation lever 22 is performed, and is provided to be freely rotatable in the upward and downward directions.

When the operator gets out of cab 5, it is necessary to reserve a passage by flipping up left-side operating device 37 from the certain position.

FIG. 5(B) shows the state in which left-side operating device 37 is flipped up from the certain position.

In this state, an operator can get out from operator seat 19 on which the operator is sitting. On the contrary, an operator can sit on operator seat 19 from this state.

When left-side operating device 37 is fixed at a certain position, an operator cannot get out from operator seat 19 or sit on operator seat 19 from outside.

Figure 6:
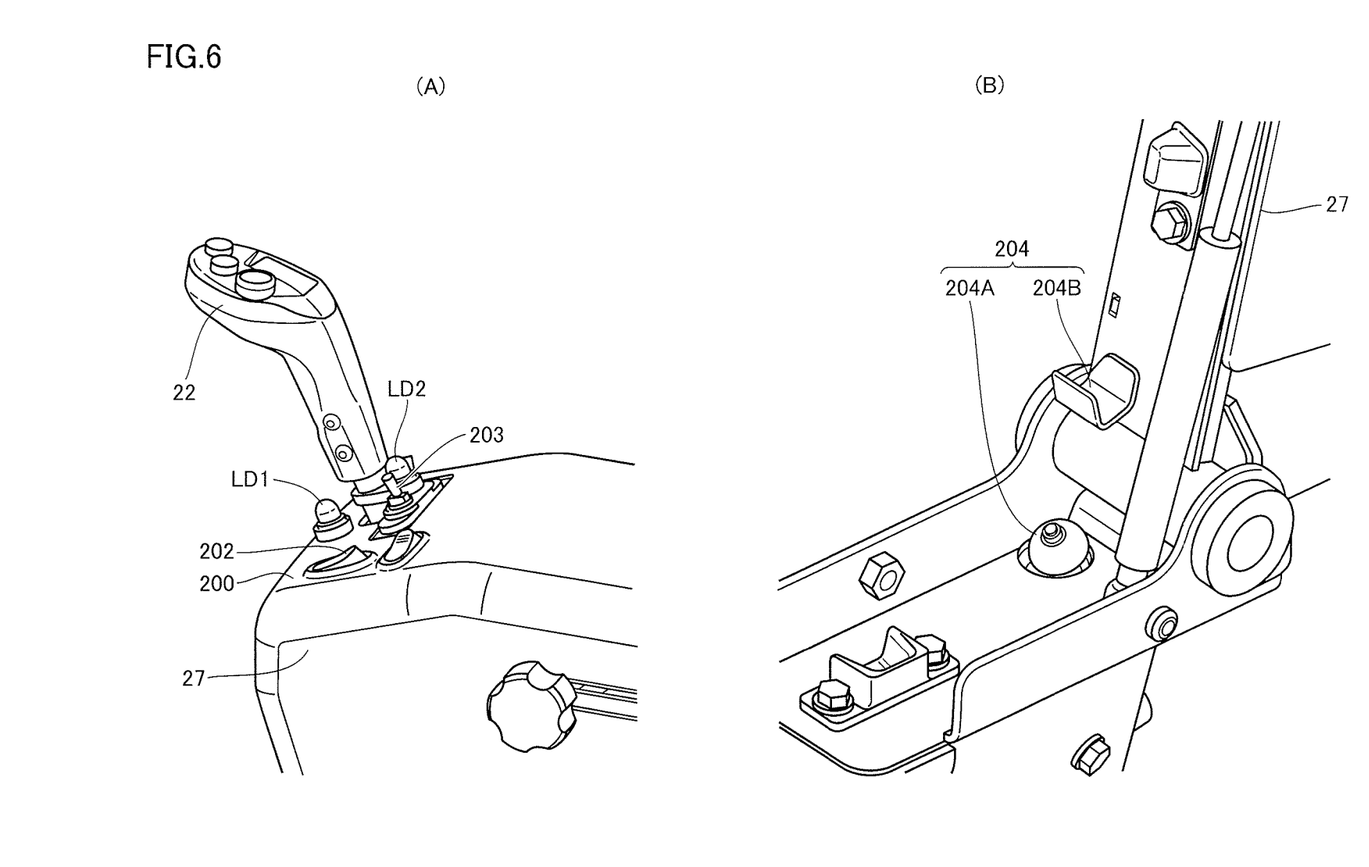
FIG. 6 represents a switch of a running operation lever 22 in accordance with the embodiment.

FIG. 6 represents switches of running operation lever 22 in accordance with the embodiment.

FIG. 6(A) represents an enlarged view of the area (dotted line area) 200 of FIG. 5(A).

As shown in the drawing, running operation lever 22 is supported on a front upper part of left-side operating device 37. Moreover, left-side operating device 37 is provided with a lever validating switch 202 for setting a steering signal from running operation lever 22 to be in a valid/invalid state.

Moreover, there are provided an adjustment switch 203 for adjusting a steering angle in accordance with an operation amount of tilting operation of running operation lever 22, an LED LD2 which turns on when adjustment switch 203 is set to be in a valid state, and an LED LD1 which turns on when steering by running operation lever 22 is validated. Providing the LEDs allows an operator to understand and confirm validation.

When adjustment switch 203 attains conduction, the steering angle in accordance with an operation amount of the tilting operation by running operation lever 22 becomes larger as compared to the case of non-conduction.

FIG. 6(B) represents a state where left-side operating device 37 provided so as to be able to flip up is flipped up. Left-side operating device 37 is provided with a flip-up switch 204.

Flip-up switch 204 has a switch main body 204A and a press-down portion 204B.

Press-down portion 204B is attached to a lower side of left-side operating device 37. When left-side operating device 37 is fixed at a certain position, press-down portion 204B comes into contact with switch main body 204A to be arranged so as to press down switch main body 204A.

Pressing down switch main body 204A by press-down portion 204B allows flip-up switch 204 to be set in a valid state. On the other hand, when left-side operating device 37 is flipped up, and released from pressing down by press-down portion 204B, flip-up switch 204 is set to be in an invalid state.

When left-side operating device 37 is located at a certain position where tilting operation by running operation lever 22 is performed, flip-up switch 204 attains conduction. When left-side operating device 37 is flipped up from the certain position, and left-side operating device 37 is located at a position where tilting operation by running operation lever 22 is difficult, flip-up switch 204 attains non-conduction.

Running operation lever 22, left-side operating device 37, lever validating switch 202, flip-up switch 204, adjustment switch 203, LED LD1, and LED LD2 are examples of the "lever," "lever support member," "first switch," "second switch," "third switch," "first light-emitting element," and "second light-emitting element" according to the present invention.

Figure 7:
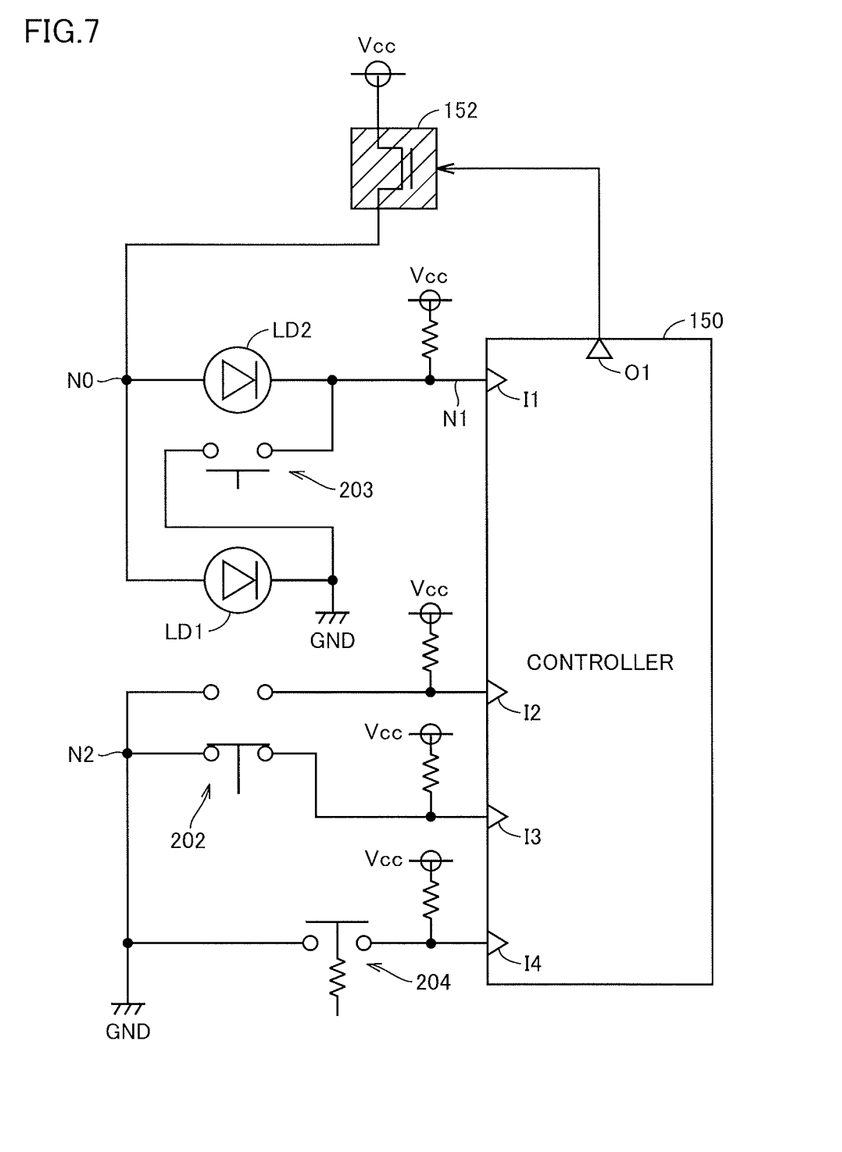
FIG. 7 is a circuit diagram representing a switch of running operation lever 22 and a controller in accordance with the embodiment.

FIG. 7 is a circuit diagram representing switches of running operation lever 22 and the controller in accordance with the embodiment.

FIG. 7 represents a relationship between controller 150 and switches.

Controller 150 has an output terminal O1 and input terminals I1 to I4. Controller 150 sets steering by running operation lever 22 to be valid/invalid in accordance with a signal inputted based on switches of running operation lever 22.

Lever validating switch 202 is provided between a ground voltage GND connected to a node N2 and controller 150. Lever validating switch 202 is a switch of a single-pole double-throw type having a plurality of terminals connected to controller 150.

Lever validating switch 202 has an ON circuit and an OFF circuit since it has a plurality of terminals of a single-pole double-throw type, and outputs a signal in accordance with a state of a switch to controller 150.

An ON circuit side of lever validating switch 202 is connected to input terminal I2. Moreover, an OFF circuit side of lever validating switch 202 is connected to input terminal I3. Input terminals I2, I3 are in the state of being pulled up by power supply voltage Vcc.

For example, when switching operation to the ON circuit side of lever validating switch 202 is performed, input terminal I2 of controller 150 is electrically coupled to node N2 connected to ground voltage GND. Thus, input terminal I2 detects "L" level. On the other hand, since input terminal I3 of controller 150 is rendered to be in an open state, it is pulled up by power supply voltage Vcc so that "H" level is detected. Accordingly, the steering signal from running operation lever 22 is set to be in a valid state.

Moreover, since input terminal I2 of controller 150 is rendered to be in an open state when switching operation to the OFF circuit side of lever validating switch 202 is performed, it is pulled up by power supply voltage Vcc so that "H" level is detected. On the other hand, input terminal I3 of controller 150 is electrically coupled to node N2 connected to ground voltage GND. Thus, input terminal I2 detects "L" level. Accordingly, the steering signal from running operation lever 22 is set to be in an invalid state.

Hence, for lever validating switch 202, when the switching operation to the ON circuit side is performed, input terminals I2, I3 detect the "L" level and the "H" level, respectively. On the other hand, when the switching operation to the OFF circuit side is performed, input terminals I2, I3 detect the "H" level and the "L" level, respectively.

When lever validating switch 202 fails, for example, when a short circuit occurs to render the switch to change from non-conduction (OFF) to conduction (ON), both input terminals I2, I3 attains the "L" level. Thus, controller 150 can determine that an abnormal state (failure) is present since signals having the same electric potential are inputted from input terminals I2, I3. On the contrary, when a supply fault occurs to cause the switch to change from conduction (ON) to non-conduction (OFF), both input terminals I2, I3 attain the "H" level. Thus, controller 150 can determine that an abnormal state (failure) is present since signals having the same electric potential are inputted from input terminals I2, I3. Accordingly, even when a failure or the like occurs in lever validating switch 202, controller 150 can determine that an abnormal state is present as described above, so that the steering by running operation lever 22 can be set to be invalid.

Flip-up switch 204 is provided between ground voltage GND connected to node N2 in parallel with lever validating switch 202 and controller 150, and is connected to an input terminal I4.

Flip-up switch 204 attains an open state (non-conduction state) in conjunction with the case where left-side operating device 37 is flipped up from a certain position, so that it is pulled up by power supply voltage Vcc, and input terminal I4 detects the "H" level. On the other hand, when left-side operating device 37 is fixed at a certain position where the tilting operation by running operation lever 22 is performed, it is electrically coupled to node N2 connected to ground voltage GND. Thus, input terminal I4 detects the "L" level.

When lever validating switch 202 is switched to the ON circuit side (valid state of the steering signal), and flip-up switch 204 attains conduction, controller 150 sets the steering by running operation lever 22 to be valid. On the other hand, when at least one of lever validating switch 202 and flip-up switch 204 attains the "L" level, controller 150 sets the steering by running operation lever 22 to be invalid. In this case, the steering by the steering wheel is prioritized.

Moreover, when lever validating switch 202 is switched to the ON circuit side (valid state of steering signal), and flip-up switch 204 attains conduction, controller 150 activates an activating portion 152. Specifically, when both signals inputted from input terminals I2, I4 detect the "L" level, controller 150 outputs an activation signal ("H" level) from output terminal O1.

Node N0 is connected to power supply voltage Vcc through activating portion 152.

LED LD1 is provided between power supply voltage Vcc electrically connected through activating portion 152 and ground voltage GND.

LED LD2 and adjustment switch 203 are provided in parallel with LED LD1 between node NO and ground voltage GND.

An intermediate node N1 between LED LD2 and adjustment switch 203 is pulled up by power supply voltage Vcc and connected to input terminal I1.

Activating portion 152 receives a signal from controller 150 to activate, and electrically couples node NO and power supply voltage Vcc.

Accordingly, a current is supplied to LED LD1 to turn on.

Moreover, when adjustment switch 203 is switched, node N1 and ground voltage GND are electrically coupled.

Accordingly, when activating portion 152 is activated, a current is supplied to LED LD2 to turn on. Further, when adjustment switch 203 is switched, input terminal I1 detects the "L" level. On the other hand, when adjustment switch 203 is not switched, input terminal I1 is pulled up by power supply voltage Vcc to detect the "H" level.

Controller 150 sets the steering angle to be larger in accordance with an operation amount of tilting operation by running operation lever 22 based on a detection of the "L" level at input terminal I1.

In accordance with the configuration described above, lever validating switch 202 and flip-up switch 204 in accordance with the embodiment are connected to controller 150 in parallel, respectively. Lever validating switch 202 has a plurality of terminals of a single-pole double-throw type, and controller 150 can determine an abnormality based on a signal from lever validating switch 202.

According to the circuit configuration based on the embodiment described above, an abnormality of the switch of running operation lever 22 can be determined in a simple manner.

Flip-up switch 204 can be also considered to determine an abnormality as a switch having a plurality of single-pole double-throw type similarly to lever validating switch 202. However, with the structure in which conduction/non-conduction is attained in conjunction with the flip-up operation of left-side operating device 37, it may be difficult to employ a switch having a plurality of terminals of a single-pole double-throw type.

Therefore, in the present embodiment, an abnormality of a switch is determined in accordance with an order of operating the switch of running operation lever 22 (an input order of signals).

Controller 150, power supply voltage Vcc, and activating portion 152 are examples of "control device" and "current supply circuit" of the present invention, respectively.

Figure 8:
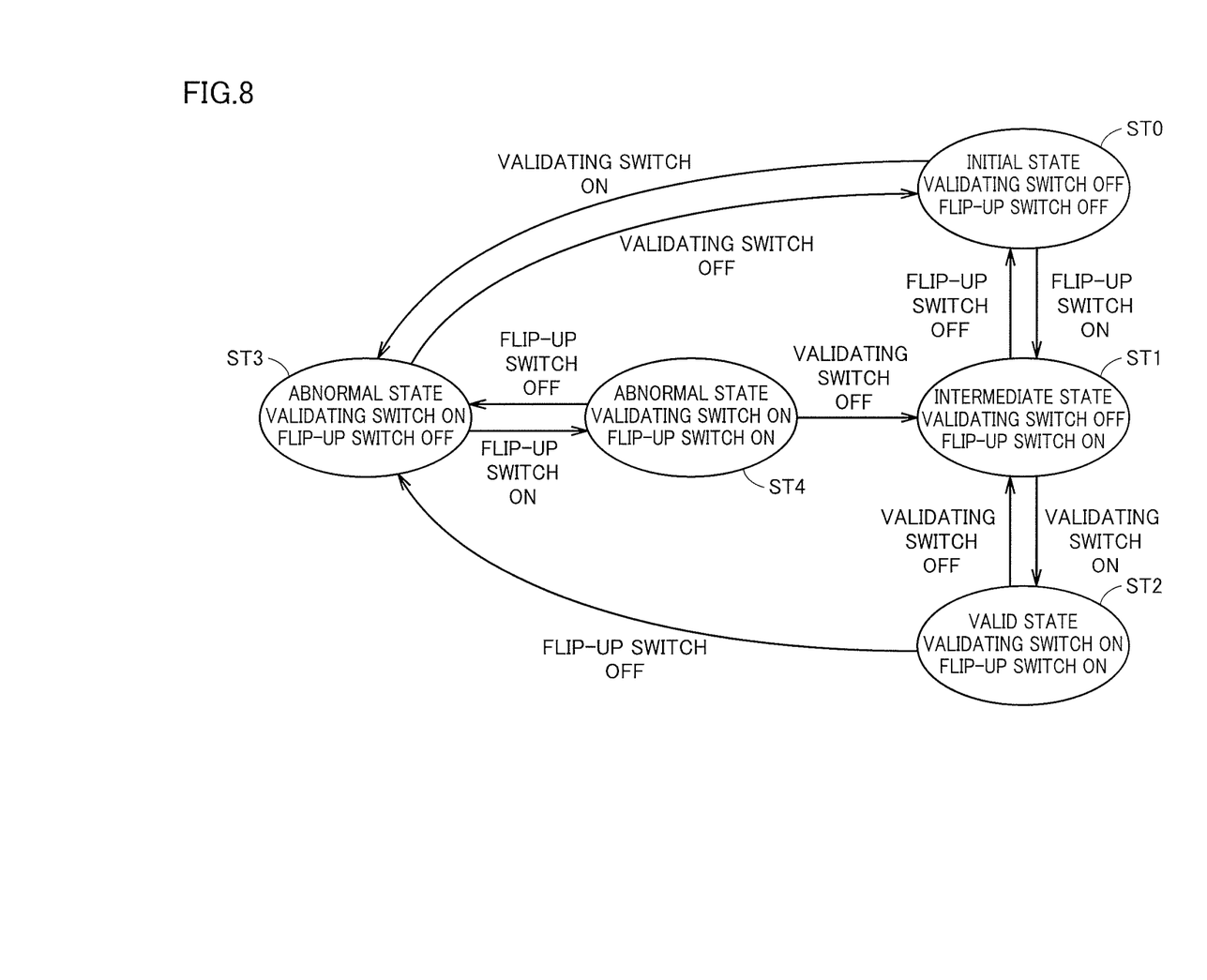
FIG. 8 represents a state transition of the switch of running operation lever 22 in accordance with the embodiment.

FIG. 8 represents state transitions of the switches of running operation lever 22 in accordance with the embodiment.

According to FIG. 8, an initial state ST0, an intermediate state ST1, a valid state ST2, and abnormal states ST3, ST4 are provided. Initial state ST0, intermediate state ST1, and valid state ST2 are also referred to as normal states in comparison with an abnormal state.

States are changed based on combinations of conduction/non-conduction (ON/OFF) of lever validating switch 202 and flip-up switch 204.

As initial state ST0, the case where lever validating switch 202 attains non-conduction (OFF) and flip-up switch 204 attains non-conduction (OFF) is shown. In this state, when flip-up switch 204 attains conduction (ON) while lever validating switch 202 maintains non-conduction (OFF), a change to intermediate state ST1 is made.

In intermediate state ST1, when lever validating switch 202 attains conduction (ON) while flip-up switch 204 maintains conduction (ON), a change to valid state ST2 is made. In this valid state ST2, controller 150 sets the steering by running operation lever 22 to be valid. Then, LED LD1 is turned on. For other states, controller 150 sets steering by running operation lever 22 to be invalid.

In intermediate state ST1, when flip-up switch 204 attains non-conduction (OFF), a change to initial state ST0 is made.

In valid state ST2, when lever validating switch 202 attains non-conduction (OFF), a change to intermediate state ST1 is made.

In valid state ST2, when flip-up switch 204 attains non-conduction (OFF), a change to abnormal state ST3 is made. In abnormal state ST3, an abnormality of a switch state is notified. Specifically, the abnormality of the switch state is displayed on display 115 of operation panel 100. Alternatively, an alarming sound may be given. Moreover, a predetermined symbol may be presented, or a color may be changed, or blinking may be given.

In abnormal state ST3, even when flip-up switch 204 attains conduction (ON), the state does not return to valid state ST2 but changes to abnormal state ST4. Thus, the abnormal state is continued. An abnormality of the switch state is displayed on display 115 of operation panel 100. Alternatively, an alarming sound may be given. Further, a predetermined symbol may be presented, or a color may be changed, or blinking may be given.

In abnormal state ST3, when lever validating switch 202 attains non-conduction (OFF), a change to initial state ST0 is made.

When a change to abnormal state ST4 is made, and lever validating switch 202 attains non-conduction (OFF) next, a change to intermediate state ST1 is made.

When a change to abnormal state ST4 is made, and flip-up switch 204 attains non-conduction (OFF) again, a change to abnormal state ST3 is made.

In initial state ST0, when lever validating switch 202 attains conduction (ON), a change to abnormal state ST3 is made.

In valid state ST2, when lever validating switch 202 does not attain non-conduction (OFF), and flip-up switch 204 attains non-conduction (OFF), it is determined that abnormal operation is conducted, thus the state transition is set to abnormal state ST3. This state is a state where left-side operating device 37 is flipped up while lever validating switch 202 attains conduction (ON). The state where left-side operating device 37 is flipped up is a state where an operator can hardly operate running operation lever 22, and also a state where switching operation of lever validating switch 202 is hard. Thus, since this is an abnormal operation, the state is taken as the abnormal state, so that operation of the switch based on an appropriate order can be prompted to the operator. As the operation of the switch in the appropriate orders, firstly, operation can be prompted to attain non-conduction (OFF) for lever validating switch 202 and then attain non-conduction (OFF) for flip-up switch 204.

Figure 9:
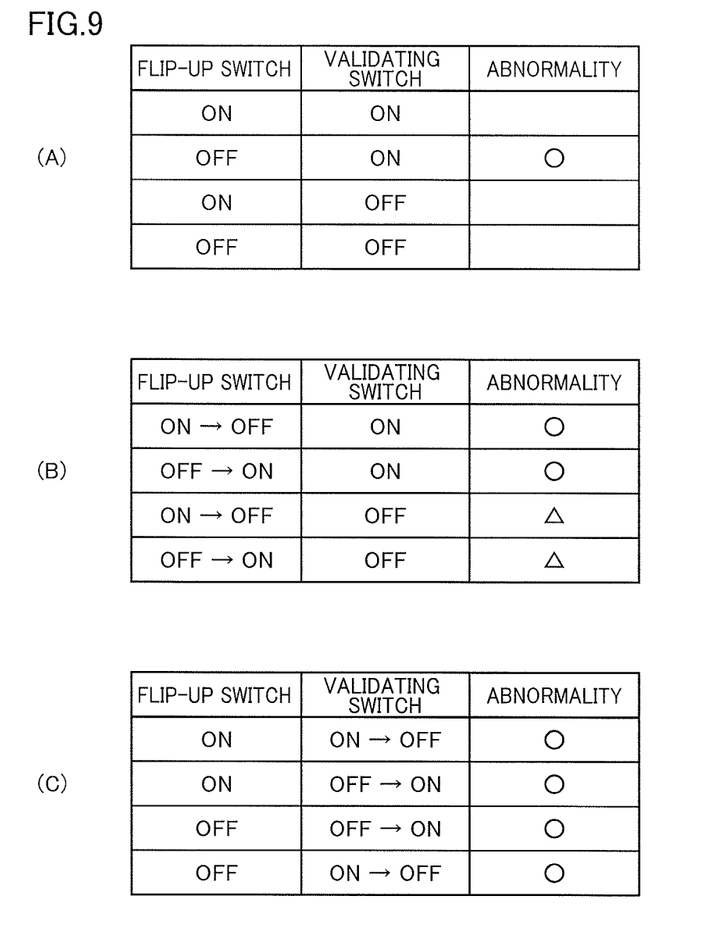
FIG. 9 represents combinations of states of the switch of running operation lever 22 for determination of an abnormality in accordance with the embodiment.

FIG. 9 represents combinations of states of switches for running operation lever 22 for determining an abnormality in accordance with the embodiment.

As shown in FIG. 9(A), when the flip-up switch attains non-conduction (OFF) and the validating switch attains conduction (ON), an abnormality is determined. Then, an alarm display is presented on operation panel 100.

Figure 10:
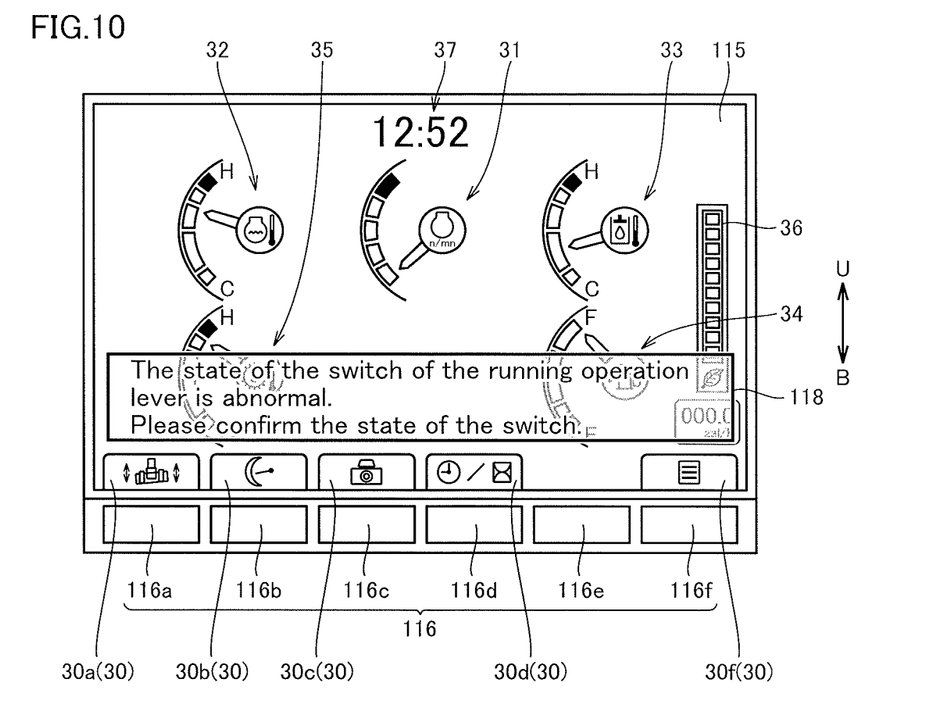
FIG. 10 represents an alarm representation displayed on a display 115 of operation panel 100.

FIG. 10 represents an alarm display to be presented on display 115 of operation panel 100.

FIG. 10 shows the case where an alarm message 118 is displayed on display 115. As an alarm message, "The state of the switch of the running operation lever is abnormal. Please confirm the state of the switch." is displayed.

An operator confirms the state, so that the state of switch is confirmed to prompt appropriate operation of the switch.

Moreover, an alarm sound together with the alarm message can be presented to notify the operator of the abnormal state. Moreover, a predetermined symbol may be presented, or a color may be changed, or blinking may be given.

Operation panel 100 is an example of a "notifying unit" of the present invention.

Referring to FIGS. 9(B) and 9(C), the drawings represent the case where the switch of running operation lever 22 which determines an abnormality fails.

FIG. 9(B) represents the case where flip-up switch 204 fails.

Specifically, when lever validating switch 202 is in the state of conduction (ON), and a failure causes flip-up switch 204 to switch from conduction (ON) to non-conduction (OFF), controller 150 can determine an abnormal state as described above.

Moreover, when lever validating switch 202 is in the state of conduction (ON), and a failure causes flip-up switch 204 to switch from non-conduction (OFF) to conduction (ON), controller 150 can determine an abnormal state as described above.

On the other hand, when lever validating switch 202 is in the state of non-conduction (OFF), and a failure causes flip-up switch 204 to switch from conduction (ON) to non-conduction (OFF), it is not determined as an abnormal state, but controller 150 is switched to an initial state as described above, so that misoperation can be prevented. The steering by running operation lever 22 is set to be invalid, and steering by the steering wheel is prioritized.

Moreover, when lever validating switch 202 is in the state of non-conduction (OFF), and a failure causes flip-up switch 204 to switch from non-conduction (OFF) to conduction (ON), it is not determined as an abnormal state, but controller 150 is switched to an intermediate state as described above, so that misoperation can be prevented. The steering by running operation lever 22 is set to be invalid, and steering by the steering wheel is prioritized.

FIG. 9(C) represents the case where lever validating switch 202 fails.

When a failure causes lever validating switch 202 to switch from conduction (ON) to non-conduction (OFF), or when a failure causes lever validating switch 202 to switch from conduction (OFF) to conduction (ON), controller 150 detects occurrence of a failure in lever validating switch 202 based on signals inputted to input terminals I2, I3, so that it can be determined as an abnormal state. The misoperation can be prevented by determining an abnormality of lever validating switch 202. The steering by running operation lever 22 is set to be invalid, and steering by the steering wheel is prioritized.

On this point, according to the conventional method, even when an abnormality has occurred in lever validating switch 202 and flip-up switch 204, since they are connected in series, determination could not be made readily on which switch has an abnormality. Further, when the switch fails, misoperation by running operation lever 22 could not be prevented. However, according to the circuit configuration based on the present embodiment, an abnormality of the switch can be determined, and misoperation by running operation lever 22 can be prevented in a simple manner.

<Others>

In the present example, the wheel loader is described as one example of the working vehicle. However, it can be also applied to a hydraulic excavator, a bulldozer, and the like, and anything as long as a working machine provided with a running operation lever.

Although the present invention has been described above, the disclosed embodiment is by way of illustration in all aspects and is not to be taken by way of limitation. The scope of the present invention is presented in the scope of patent, and is intended to include all the modification within the meaning and scope equivalent to those in the claims.

REFERENCE SIGNS LIST 1 wheel loader; 2 vehicle body frame; 3 work implement; 4 front tires; 5 cab; 6 engine room; 7 rear tires; 11 front frame; 12 rear frame; 13 coupling portion; 15 lift arm; 16 bucket; 19 operator seat; 20 steering device; 21 steering wheel; 22 running operation lever; 23L, 23R steering cylinder; 25 steering valve; 25a directional control valve; 26 orbit roller; 27 lever electromagnetic control valve; 30 pump; 31 tank; 34, 35 stop valve; 37 left-side operating device; 71 steering wheel priority valve; 100 operation panel; 115 display.

The invention claimed is:

1. A steering device of a working vehicle, comprising:
a lever which performs tilting operation for steering;
a first switch for setting a steering signal from the lever to be in a valid/invalid state;
a lever support member which is provided so as to be able to flip up from a certain position of performing tilting operation with use of the lever and supports the lever;

a second switch which attains conduction when the lever support member is located at the certain position, and attains non-conduction in conjunction with a case where the lever support member is flipped up from the certain position; and a control device for setting steering with use of the lever to be valid/invalid, wherein the first switch having a plurality of terminals which attain conduction of a steering signal from the lever in accordance with setting of a valid state and an invalid state and are electrically connected to the control device in parallel with the second switch, and the control device determines an abnormal state in accordance with an input order of signals inputted based on the first and second switches.

2. The steering device of a working vehicle according to claim 1, wherein the control device determines an abnormal state in accordance with signals inputted based on the first and second switches.

3. The steering device of a working vehicle according to claim 2, wherein the control device determines the abnormal state when signals inputted from the plurality of terminals based on the first switch are signals having the same electrical potential.

4. The steering device of a working vehicle according to claim 1, further comprising:

a first light-emitting element which emits light in accordance with a passing current; and a current supply circuit which can supply a current to the first light-emitting element, wherein the control device activates the current supply circuit in accordance with a combination of signals inputted based on the first and second switches.

5. The steering device of a working vehicle according to claim 4, further comprising: a third switch connected to the current supply circuit in parallel with the first light-emitting element to adjust a steering angle in accordance with an operation amount of the lever.

6. The steering device of a working vehicle according to claim 5, further comprising: a second light-emitting element which is connected to the current supply circuit in parallel with the first light-emitting element and connected to the third switch in series to emit light in accordance with a passing current.

7. The steering device of a working vehicle according to claim 2, further comprising a notifying unit which notifies the abnormal state.

8. A method for controlling a steering device of a working vehicle, comprising the steps of:

operating a first switch for setting a steering signal from a lever which performs tilting operation for steering to be in a valid/invalid state, a lever support member being provided so as to be able to flip up from a certain position of performing the tilting operation by the lever and supporting the lever;

operating a second switch which attains conduction when the lever support member is located at the certain position and attains non-conduction in conjunction with the case of the lever support member being flipped up from the certain position; and determining an abnormal state in accordance with a signal inputted based on the operation of the first and second switches, the step of determining the abnormal state determines the abnormal state when the second switch is changed from conduction to non-conduction, and the first switch sets the lever to be in a valid state.

* * * * *